(12) United States Patent
Teo

(10) Patent No.: US 6,246,413 B1
(45) Date of Patent: Jun. 12, 2001

(54) METHOD AND SYSTEM FOR CREATING PANORAMAS

(75) Inventor: Patrick Cheng-San Teo, San Jose, CA (US)

(73) Assignee: MGI Software Corporation, Richmond Hill (CA)

( * ) Notice: Subject to any disclaimer, the term of this patent is extended or adjusted under 35 U.S.C. 154(b) by 0 days.

(21) Appl. No.: 09/136,108

(22) Filed: Aug. 17, 1998

(51) Int. Cl.[7] ................................................. G06T 17/00
(52) U.S. Cl. .............................................. 345/419; 345/429
(58) Field of Search ..................................... 345/430, 418, 345/419, 420, 428, 429, 433

(56) References Cited

U.S. PATENT DOCUMENTS

| 5,495,576 | * | 2/1996 | Ritchey | 345/425 |
| 5,563,650 | * | 10/1996 | Poelstra | 348/36 |
| 5,987,164 | * | 11/1999 | Szeliski et al. | 345/425 |
| 6,009,190 | * | 12/1999 | Szeliski et al. | 345/430 |

* cited by examiner

*Primary Examiner*—Cliff N. Vo
(74) *Attorney, Agent, or Firm*—Blakely, Sokoloff, Taylor & Zafman

(57) ABSTRACT

A method and system for modifying a panoramic image of a scene, so as to alter its surface geometry, including providing an initial panoramic image of a scene projected onto an initial surface, generating, in response to user input, a desired surface upon which the scene is to be projected, and modifying the initial panoramic image by mapping points on the desired surface to corresponding points on the initial surface to produce a modified panoramic image corresponding to projection of the scene onto the desired surface.

68 Claims, 13 Drawing Sheets

$x^n + y^n = 1$

METHOD AND SYSTEM FOR CREATING PANORAMAS

FIELD OF THE INVENTION

The present invention relates to panoramic images of scenes.

BACKGROUND OF THE INVENTION

Cartography has long been concerned with the ability to accurately portray the surface of a three-dimensional object by a planar drawing. The classical Mercatur projection, still an underlying basis of map-making today, was developed in order to render the surface of a sphere onto a planar map.

Panoramic images of a scene are two-dimensional renditions of a three-dimensional scene of up to 360° in circumference. The images are synthesized by taking video footage or multiple still photographs of a scene, as the camera rotates through a range of angles. In addition, either the images individually or the synthesized image is projected onto a surface such as that of a cylinder or sphere. The surface is parametrized in terms of two coordinates, and these coordinates are uniformly sampled, so that the pixel values at the sample points can be used to generate a digital image in one of the standard image formats such as JPEG (Joint Photographics Expert Group). In this way a three-dimensional scene is rendered into a representation through a two-dimensional (planar) panoramic digital image.

Conventional panoramic digital images typically have an unnatural look to them, since the "round" 360° scene is "warped" onto a single "flat" digital image. As a result, panoramic images viewed without viewer software typically have little or no utility in and of themselves. Special viewer software which corrects the perspective of the surface projection is normally necessary to view panoramic images. This software only enables a small portion (or "window") of the full panoramic image to be viewed at any single instant of time, since the perspective correction varies as the viewer's line of sight is changed.

As an example, one may consider the FLASHPIX® image format along with an extension thereof that embeds panoramic data, such as field of view and angular range information, into a FLASHPIX® image. FLASHPIX®, a registered trademark of the Digital Imaging Group (DIG), is an example of a multi-resolution tiled image format. A core FLASHPIX® reader, that is not able to access the embedded panoramic data, would only be able to display the panoramic image as a flat two-dimensional image, without perspective correction. This image would appear awkward, but is nevertheless a FLASHPIX® compliant digital image that can be successfully displayed.

As another example, when a conventional panoramic image is printed, it looks like a poster with a 360° view—for example, a panoramic view of New York City. However, due to warping, the details of the poster appear unnatural.

SUMMARY OF THE INVENTION

The present invention provides a method and system for creating a panoramic image of a desired scene projected onto a general surface geometry. An embodiment of the present invention includes a user interface for interactively controlling the shape of the general surface geometry.

Typically photographs of the desired scene are stitched together to form a first panoramic image, corresponding, for example, to a cylindrical or spherical geometry. The present invention teaches how to modify the first panoramic image so as to obtain a modified panoramic image corresponding to a projection of the desired scene onto another surface. Thus the present invention can be used to transform a cylindrical or spherical panoramic image into a modified panoramic image having a different surface geometry.

There is thus provided in accordance with a preferred embodiment of the present invention a method for creating a panoramic image of a scene, including providing an initial panoramic image of a scene, generating, in response to user input, a surface upon which the scene is to be projected, to form a generated surface, and modifying the initial panoramic image using the generated surface to produce a modified panoramic image corresponding to projection of the scene upon the generated surface.

Additionally in accordance with a preferred embodiment of the present invention the method further includes the step of printing the modified panoramic image.

Moreover in accordance with a preferred embodiment of the present invention the method further includes the step of storing the modified panoramic image on a server computer for providing access over a network.

Further in accordance with a preferred embodiment of the present invention the generating includes repositioning indicators at selected areas within the initial panoramic image.

Still further in accordance with a preferred embodiment of the present invention the generating includes repositioning indicators to control the scale of the generated surface.

Additionally in accordance with a preferred embodiment of the present invention the modified panoramic image has reduced distortion of straight lines as compared with the initial panoramic image.

Moreover in accordance with a preferred embodiment of the present invention the generated surface is a surface with a rounded polygonal cross-sections.

Further in accordance with a preferred embodiment of the present invention the generating includes positioning indicators to control the lengths of sides of the rounded polygonal cross-section.

Still further in accordance with a preferred embodiment of the present invention the generating includes positioning indicators to control the curvatures of corners of the rounded polygonal cross-section.

There is also provided in accordance with a preferred embodiment of the present invention a method for creating a panoramic image of a scene, including generating, in response to user input, a surface upon which a scene is to be projected, to form a generated surface, and computing projection of the scene onto the generated surface to produce a panoramic image.

Additionally in accordance with a preferred embodiment of the present invention the method further includes the step of printing the panoramic image.

Moreover in accordance with a preferred embodiment of the present invention the method further includes the step of storing the panoramic image on a server computer for providing access over a network.

Further in accordance with a preferred embodiment of the present invention the method further includes the step of providing an initial panoramic image and the generating step includes repositioning indicators at selected areas within the initial panoramic image.

Still further in accordance with a preferred embodiment of the present invention the generating includes repositioning indicators to control the scale of the generated surface.

Additionally in accordance with a preferred embodiment of the present invention the modified panoramic image has reduced distortion of straight lines as compared with the initial panoramic image.

Moreover in accordance with a preferred embodiment of the present invention the generated surface is a surface with a rounded polygonal cross-sections.

Further in accordance with a preferred embodiment of the present invention the generating includes positioning indicators to control the lengths of sides of the rounded polygonal cross-section.

Still further in accordance with a preferred embodiment of the present invention the generating comprises positioning indicators to control the curvatures of corners of the rounded polygonal cross-section.

There is also provided in accordance with a preferred embodiment of the present invention a method for creating, from a first panoramic image of the scene projected onto a first surface, a second panoramic image of a scene projected onto a second surface, including modifying the first panoramic image using the first and second surfaces to produce a second panoramic image corresponding to projection of the scene upon the second surface.

Additionally in accordance with a preferred embodiment of the present invention the method further includes the step of printing the second panoramic image.

Moreover in accordance with a preferred embodiment of the present invention the method further includes the step of storing the second panoramic image on a server computer for providing access over a network.

Further in accordance with a preferred embodiment of the present invention the second panoramic image has reduced distortion of straight lines as compared with the first panoramic image.

There is also provided in accordance with a preferred embodiment of the present invention a system for creating a panoramic image of a scene, including a memory storing an initial panoramic image of a scene, a user interface generating a surface upon which the scene is projected, to form a generated surface, and an image processor modifying the initial panoramic image using the generated surface to produce a modified panoramic image corresponding to projection of the scene upon the generated surface.

Additionally in accordance with a preferred embodiment of the present invention the system further includes a printer for printing the modified panoramic image.

Moreover in accordance with a preferred embodiment of the present invention the system further includes a server computer for distributing the modified panoramic image over a network.

Further in accordance with a preferred embodiment of the present invention the user interface includes adjustable indicators for selecting areas within the initial panoramic image.

Still further in accordance with a preferred embodiment of the present invention the user interface includes indicators for controlling the scale of the generated surface.

Additionally in accordance with a preferred embodiment of the present invention the modified panoramic image has reduced distortion of straight lines as compared with the initial panoramic image.

Moreover in accordance with a preferred embodiment of the present invention the generated surface is a surface with a rounded polygonal cross-section.

Further in accordance with a preferred embodiment of the present invention the user interface includes indicators for controlling the lengths of sides of the rounded polygonal cross-section.

Still further in accordance with a preferred embodiment of the present invention the user interface includes indicators for controlling the curvatures of corners of the rounded polygonal cross-section.

There is also provided in accordance with a preferred embodiment of the present invention a system for creating a panoramic image of a scene, including a user interface generating a surface upon which the scene is projected, to form a generated surface, and an image processor projecting the scene onto the generated geometry to produce a modified panoramic image corresponding to projection of the scene upon the generated surface.

Additionally in accordance with a preferred embodiment of the present invention the system further includes a printer for printing the modified panoramic image.

Moreover in accordance with a preferred embodiment of the present invention the system further includes a server computer for distributing the modified panoramic image over a network.

Further in accordance with a preferred embodiment of the present invention the system further includes an initial panoramic image and the user interface includes adjustable indicators for selecting areas within the initial panoramic image.

Still further in accordance with a preferred embodiment of the present invention the user interface includes indicators for controlling the scale of the generated surface.

Additionally in accordance with a preferred embodiment of the present invention the modified panoramic image has reduced distortion of straight lines as compared with the initial panoramic image.

Moreover in accordance with a preferred embodiment of the present invention the generated surface is a surface with a rounded polygonal cross-section.

Further in accordance with a preferred embodiment of the present invention the user interface includes indicators for controlling the lengths of sides of the rounded polygonal cross-section.

Still further in accordance with a preferred embodiment of the present invention the user interface includes indicators for controlling the curvatures of corners of the rounded polygonal cross-section.

There is also provided in accordance with a preferred embodiment of the present invention a system for creating, from a first panoramic image of a scene projected upon a first surface, a second panoramic image of the scene projected onto a second surface, including a memory storing the first panoramic image, and an image processor modifying the first panoramic image using the first and second surfaces to produce a second panoramic image corresponding to projection of the scene upon the second surface.

Additionally in accordance with a preferred embodiment of the present invention the system of further includes a printer for printing the second panoramic image.

Moreover in accordance with a preferred embodiment of the present invention the system of further includes a server computer for distributing the second panoramic image over a network.

Further in accordance with a preferred embodiment of the present invention the second panoramic image has reduced distortion of straight lines as compared with the first panoramic image.

There is also provided in accordance with a preferred embodiment of the present invention a method for creating a panoramic image of a scene, including displaying an initial panoramic image of a scene, manipulating a polyhedral surface upon which the scene is to be projected, relative to the initial panoramic image, to form an adjusted surface, and modifying the initial panoramic image to produce a modified panoramic image corresponding to projection of the scene upon the adjusted surface.

Additionally in accordance with a preferred embodiment of the present invention the manipulating comprises adjusting the scale of the polyhedral surface.

Moreover in accordance with a preferred embodiment of the present invention the manipulating comprises rotating the polyhedral surface.

Further in accordance with a preferred embodiment of the present invention the manipulating comprises repositioning edges of the polyhedral surface.

Still further in accordance with a preferred embodiment of the present invention the modified panoramic image has reduced distortion of straight lines as compared with the initial panoramic image.

There is also provided in accordance with a preferred embodiment of the present invention a system for creating a panoramic image of a scene, a memory storing an initial panoramic image of a scene, a user interface adjusting a polyhedral surface upon which the scene is to be projected, relative to the initial panoramic image, to form an adjusted surface, and an image processor modifying the initial panoramic image to produce a modified panoramic image corresponding to projection of the scene upon the adjusted surface.

Additionally in accordance with a preferred embodiment of the present invention the user interface comprises adjustable indicators for adjusting the scale of the polyhedral surface.

Moreover in accordance with a preferred embodiment of the present invention the user interface comprises adjustable indicators for rotating the polyhedral surface.

Further in accordance with a preferred embodiment of the present invention the user interface comprises adjustable indicators for repositioning edges of the polyhedral surface.

Still further in accordance with a preferred embodiment of the present invention the modified panoramic image has reduced distortion of straight lines as compared with the initial panoramic image.

There is also provided in accordance with a preferred embodiment of the present invention a computer-readable medium having instructions stored thereon which, when executed by a processor, cause the processor to provide an initial panoramic image of a scene, generate a surface upon which the scene is projected in response to user input, to form a generated surface, and modify the initial panoramic image using the generated surface to produce a modified panoramic image corresponding to projection of the scene upon the generated surface.

Additionally in accordance with a preferred embodiment of the present invention the computer-readable medium is a computer data signal encoded in a carrier wave.

There is also provided in accordance with a preferred embodiment of the present invention a computer-readable medium having instructions stored thereon which, when executed by a processor, cause the processor to generate, in response to user input, a surface upon which the scene is projected, to form a generated surface, and project the scene onto the generated surface to produce a modified panoramic image.

Additionally in accordance with a preferred embodiment of the present invention the computer-readable medium is a computer data signal encoded in a carrier wave.

There is also provided in accordance with a preferred embodiment of the present invention a computer-readable medium having instructions stored thereon which, when executed by a processor, cause the processor to modify a first panoramic image using first and second surfaces to produce a second panoramic image corresponding to projection of a scene upon the second surface.

Additionally in accordance with a preferred embodiment of the present invention the computer-readable medium is a computer data signal encoded in a carrier wave.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

The present invention concerns a method and system for creating a digital panoramic image of a scene. Panoramic images are created from one or more photographs of a scene. In the case of multiple photographs, the photographs are taken from a fixed viewing origin in different viewing directions, in such a way that there is some overlap between each photograph and its predecessor. The resulting photographs are stitched together so as to form a single omniview image, spanning up to 360° around. The omniview image is then projected onto a surface geometry, such as that of a sphere, cylinder or cube. The projected image is typically a digital image complying with one of the many standard image formats available today, such as JPEG. The photographs need not be digital images, but typically they are converted to digital form prior to being stitched together.

References herein to projecting and projection need not involve physical projection, but may, in most cases, refer to calculation of the projection of a given image upon a given surface.

Digital stitching algorithms typically operate by adjusting each digital photograph so as to align the overlapping region with that of its predecessor, and by blending the aligned photograph with its predecessor, so as to eliminate any visible stitching artifacts. Assignee's co-pending U.S. patent application Ser. No. 08/922,732, filed Sep. 3, 1997 and entitled A METHOD AND SYSTEM FOR COMPOSITING IMAGES, the disclosure of which is hereby incorporated by reference, discloses a method and system for aligning digital photographs and blending them together.

Digital panoramic images can be used for interactive viewing of scenes. Viewing software enables a user to view a portion of the scene, and to translate the portion of the scene being viewed by panning in multiple directions. This gives the user the experience of navigating within the scene. Viewing software also enables a user to zoom in and out of the scene. This gives the user the experience of increasing or decreasing the fields of view, thereby magnifying or reducing the scene. In Internet-based applications, the full panoramic image can reside on a remote server computer and thus be accessible for viewing by multiple clients at remote sites.

Figure 1A:
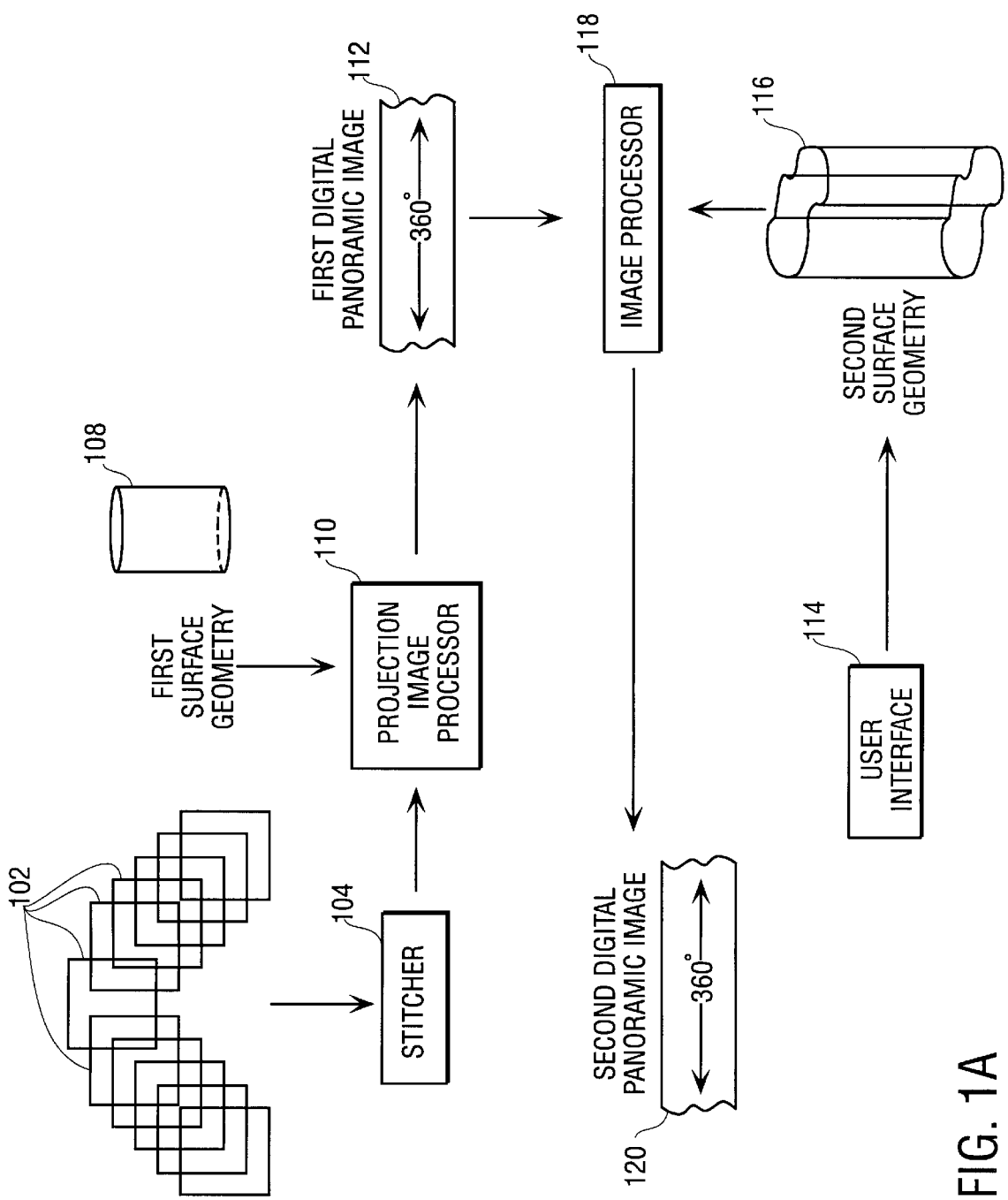
FIGS. 1A and 1B are simplified illustrations of key elements involved in creating digital panoramic images in accordance with a preferred embodiment of the present invention.

FIG. 1A is a simplified illustration of the key elements involved in creating digital panoramic images. Multiple overlapping photographs 102 of a scene, each taken in a different viewing direction, are stitched together by means of a stitcher 104. The stitched together image 106 is projected onto a first surface geometry 108 by means of a projection image processor 110, so as to obtain a first digital panoramic image 112. As described hereinbelow, the present invention enables a user to modify the surface geometry by means of a user interface 114, thereby obtaining a second surface geometry 116. The present invention further includes an image processor 118 for transforming the first digital panoramic image 112 into a second digital panoramic image 120 corresponding to the projection of the scene onto the second surface geometry 116. The second digital panoramic image 120 could also have been obtained by projecting the original stitched together image 106 onto the second geometry, but it is easier to accomplish this by directly transforming the first digital panoramic image 112 into the second digital panoramic image 120.

Figure 1B:
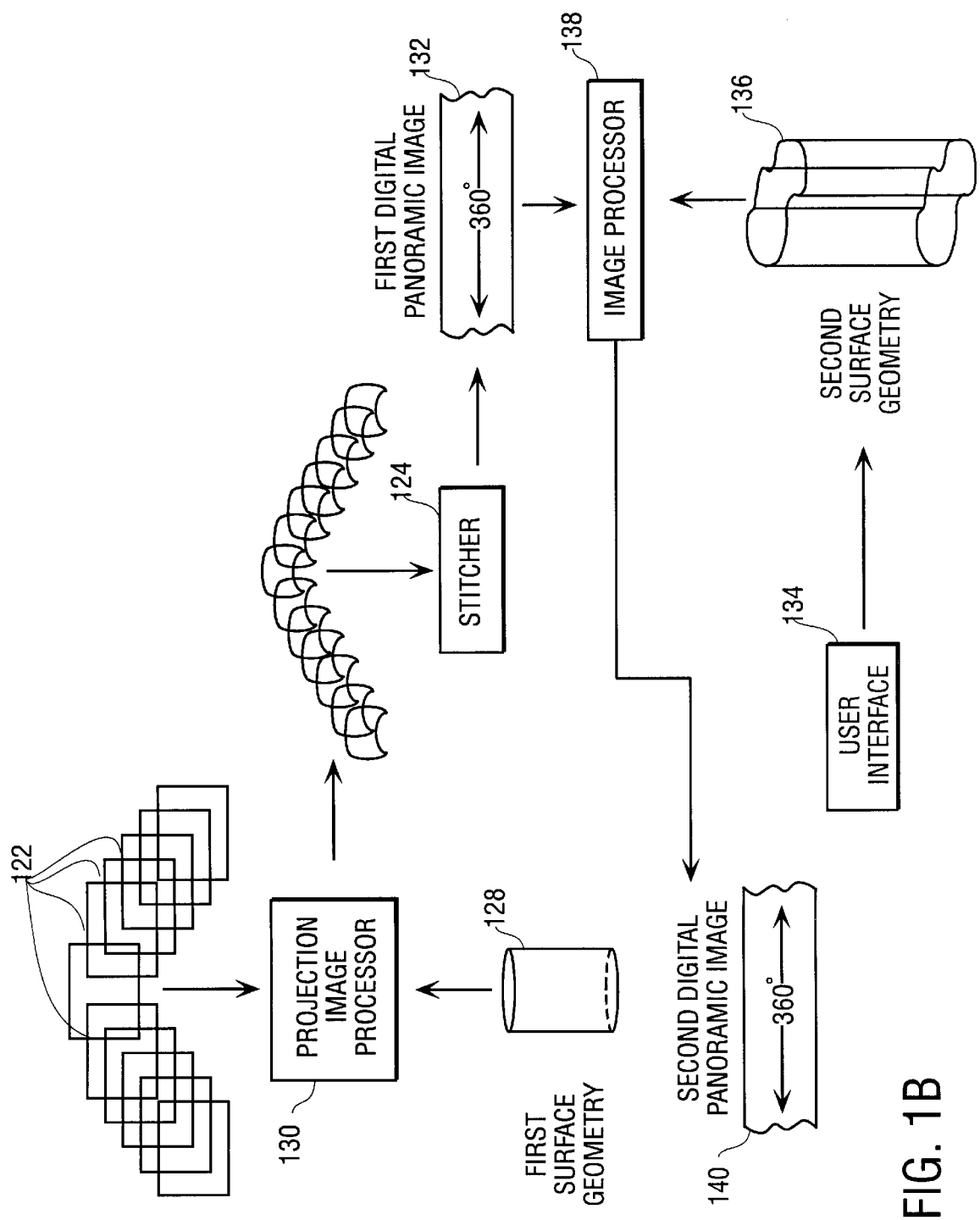

Alternatively, the individual photographs can be individually projected onto the first surface geometry prior to their being stitched together, as illustrated in FIG. 1B. FIG. 1B has analogous elements to FIG. 1A, but the order is reversed in that stitcher 124 operates after projection image processor 130.

Panoramic images typically exhibit warped curvature on account of their having been projected onto a surface. A function of viewing software is to invert the projection, thereby "straightening out" the portion of the panoramic image being displayed, thereby recovering the natural look of the original scene. Both forward projection for creating the panoramic image and inverse projection for subsequent viewing involve matching points in a plane to points on a surface that lie on the same ray emanating from the viewing origin.

Special purpose image processing algorithms are used for efficient implementation of forward and inverse projection. Assignee's U.S. Pat. No. 5,748,194, entitled RENDERING PERSPECTIVE VIEWS OF A SCENE USING A SCAN-LINE COHERENT LOOK-UP TABLE, the disclosure of which is hereby incorporated by reference, discloses a panorama viewing method that processes entire scanlines at a time. Assignee's co-pending U.S. patent application Ser. No. 09/057,013, filed Apr. 7, 1998 and entitled A METHOD AND SYSTEM FOR PANORAMA VIEWING, the disclosure of which is hereby incorporated by reference, discloses a panorama viewing method and system based on a panoramic image that is encoded as a multi-resolution digital image format.

On account of their warped curvature, panoramic images themselves do not appear natural when viewed as raw images without viewer software, or when sent directly to a printer for printing. For example, straight lines within the scene typically appear curved in the panoramic image.

The present invention enables a user to control the shape of the geometrical surface onto which a panorama is projected. By appropriately shaping the surface, a user can create a panoramic image with horizontal lines that do not appear concave. Such an image has a natural look to it, and can be printed without appearing warped.

Figure 2:
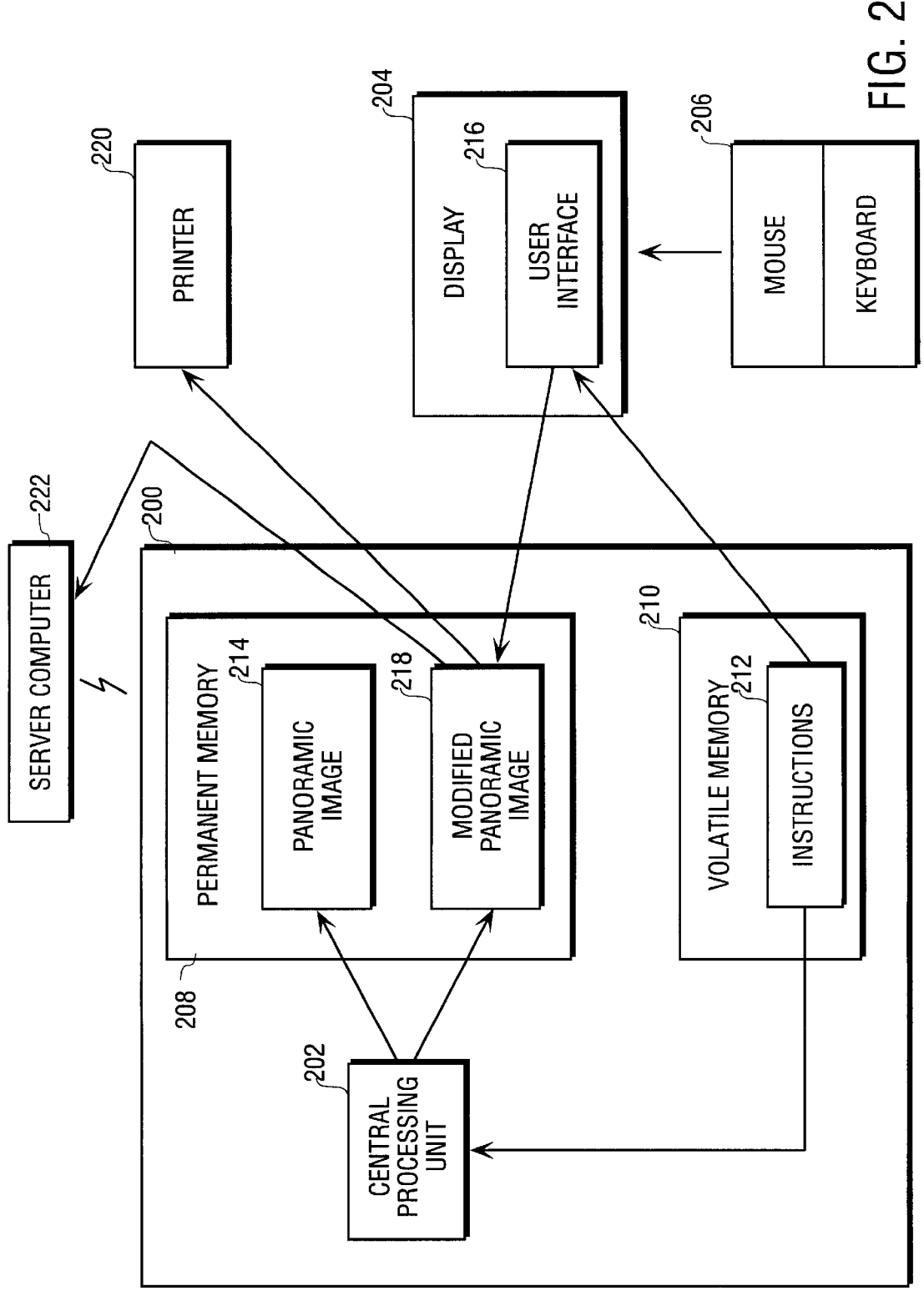
FIG. 2 is a schematic diagram of a computer system implementing a preferred embodiment of the present invention.

FIG. 2 is a schematic diagram of a computer system implementing a preferred embodiment of the present invention, corresponding to the user interface 114 and image processor 118 from FIG. 1A. Shown in FIG. 2 is a computer system 200 with a central processing unit 202, a display device 204, a user input device 206, such as a mouse of keyboard, a permanent memory 208 for storing digital images, a volatile memory 210 for storing instructions, a peripheral printer 220 for printing digital images stored in memory 208 and a server computer 222 for archiving digital images for distribution over a network. Instructions 212 for carrying out a preferred embodiment of the present invention preferably reside within memory 210. Also shown in FIG. 2 is a given panoramic image 214, corresponding to the projection of a scene on a given geometry such as that of a cylinder or sphere.

Instructions 212 control a user interface 216 that is displayed upon display device 204, by means of processing unit 202. By means of user input device 206, a user controls the shape of a general surface geometry. Instructions 212 instruct processing unit 202 to transform the panoramic image 214 from its initial geometry to a modified panoramic image 218 corresponding to the scene being projected onto the above determined surface geometry. The modified panoramic 218 can be printed by printer 220 to produce a poster. It can also be stored on server computer 222 for access over a network. The present invention describes both the operation of the user interface in determined a surface geometry, and the method for transforming a given panoramic image of a scene projected onto a first geometry into a modified panoramic image of the scene projected onto a second geometry.

Figure 3:
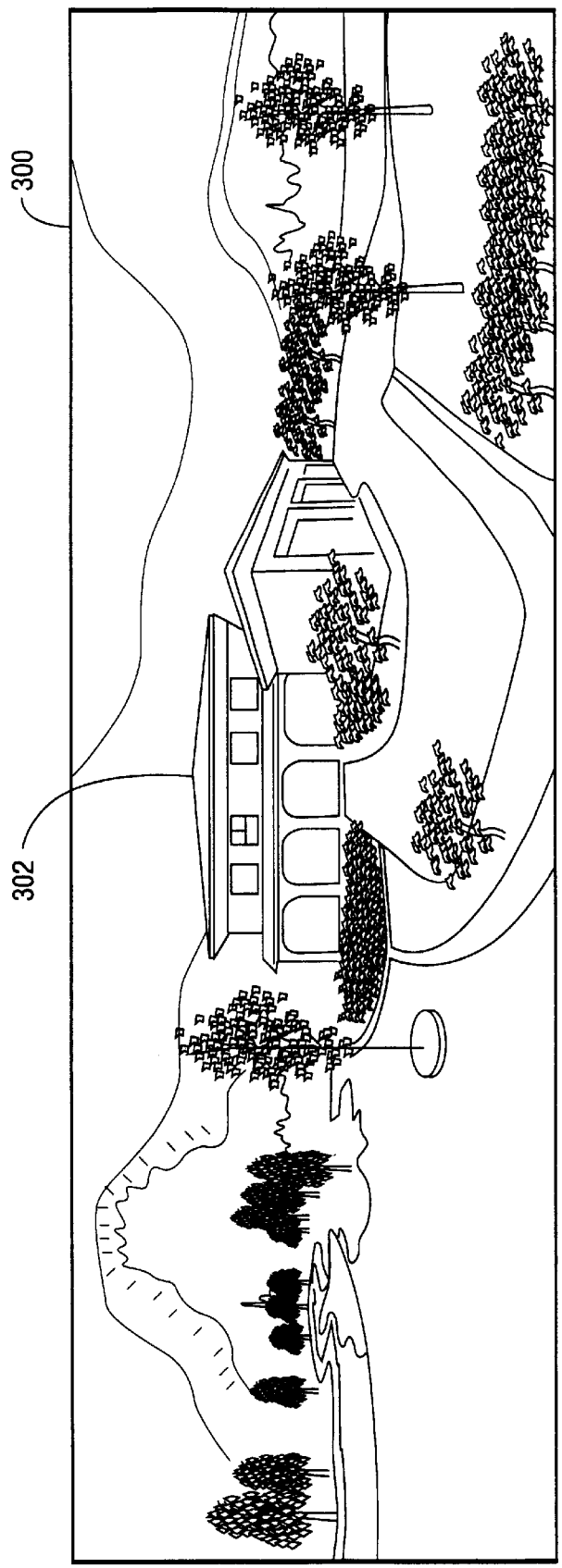
FIG. 3 is an illustration of a prior art panoramic image exhibiting warped distortion of straight lines.

FIG. 3 is a prior art illustration of a panoramic image 300 exhibiting warped distortion of horizontal lines. The roof of the house, indicated by reference numeral 302, for example, has a downward concave distortion.

Figure 4A:
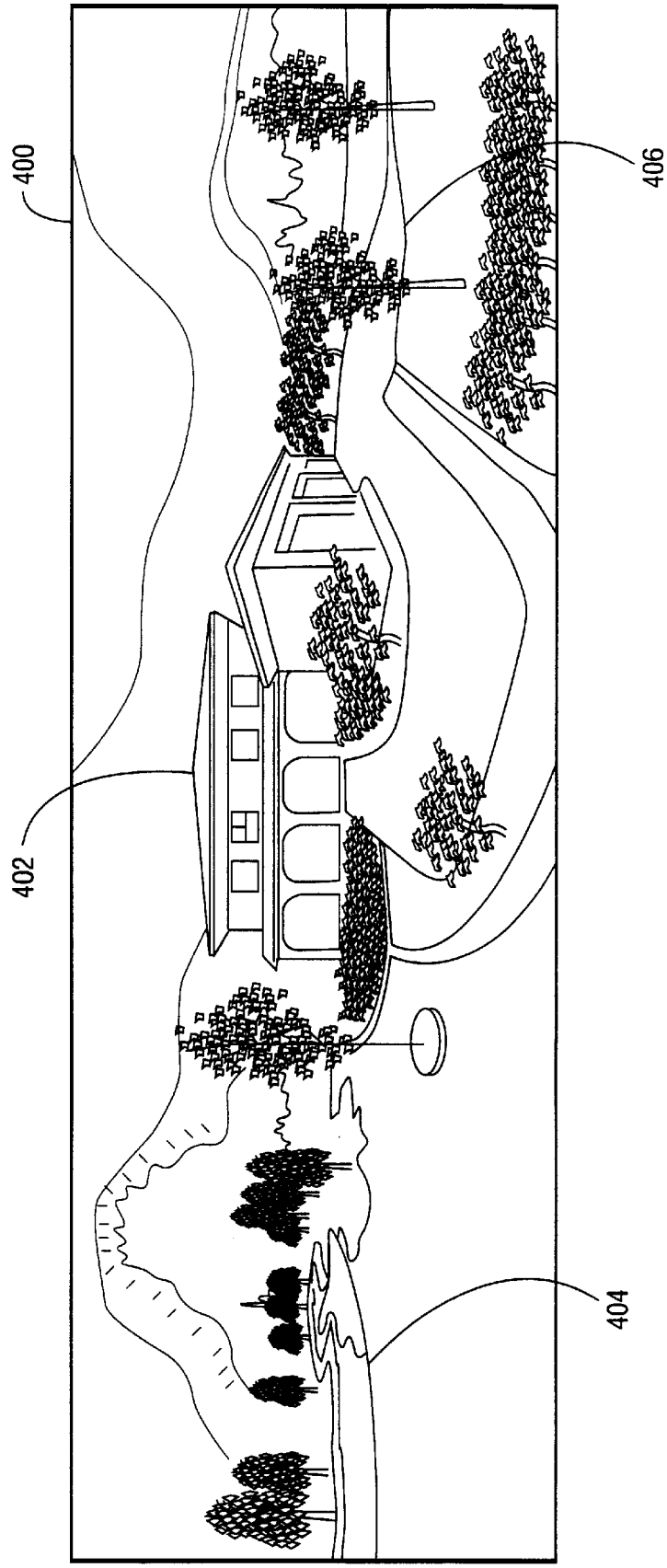
FIG. 4A is an illustration of a panoramic image created in accordance with a preferred embodiment of the present invention, without readily visible distortion of straight lines.

FIG. 4A is an illustration of a panoramic image 400 created in accordance with a preferred embodiment of the present invention, without visible distortion of horizontal lines. In FIG. 4A the roof of the house, indicated by reference numeral 402, appears straight and horizontal. However, FIG. 4A also exhibits sharp bends in straight lines at positions in the Figure that are approximately 1 inch from the left and right ends of the panoramic image, indicated by reference numerals 404 and 406, respectively.

Figure 4B:
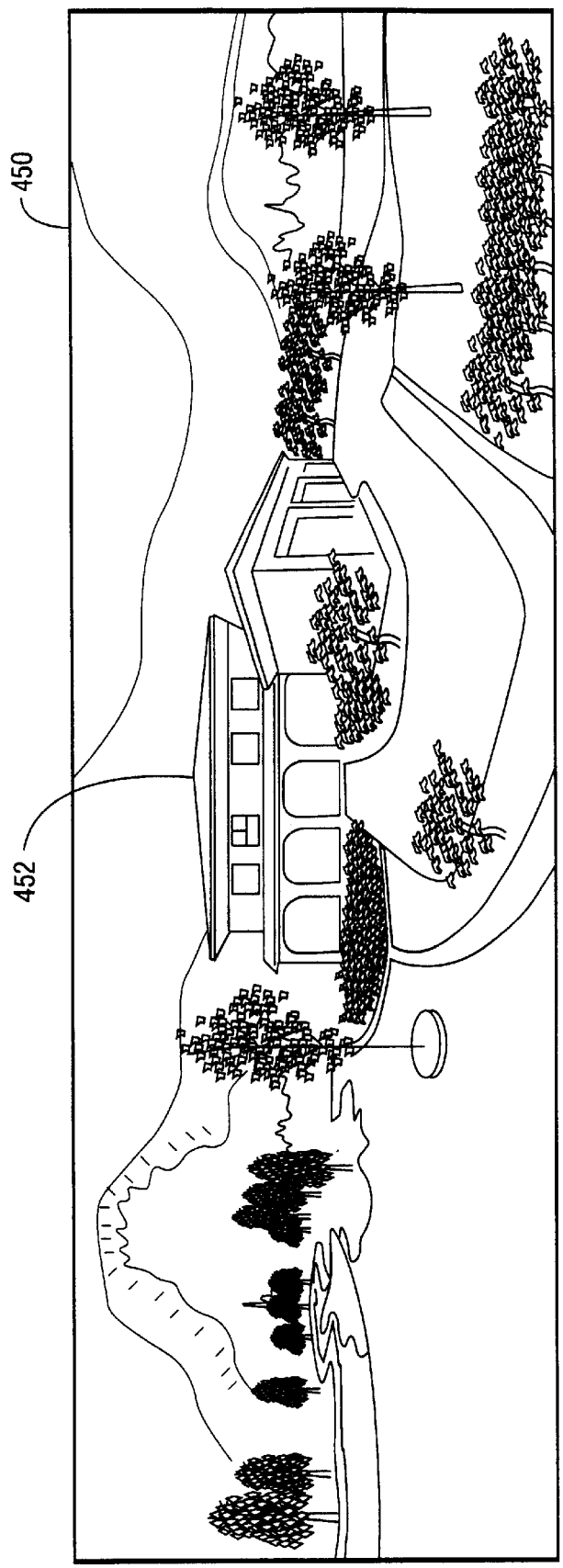
FIG. 4B is an illustration of a panoramic image created in accordance with a preferred embodiment of the present invention, without readily visible distortion of straight lines and without bending distortion.

FIG. 4B is another illustration of a panoramic image 450 created in accordance with a preferred embodiment of the present invention, without visible distortion of horizontal lines. FIG. 4B was created by adjusting the surface geometry of the panorama by means of a user interface. A user adjusted the surface in the manner described hereinbelow so as to eliminate the bending artifact. In FIG. 4B the roof, indicated by reference numeral 452, appears horizontal and straight, and the bending artifacts from FIG. 4A have also been eliminated.

Figure 5:
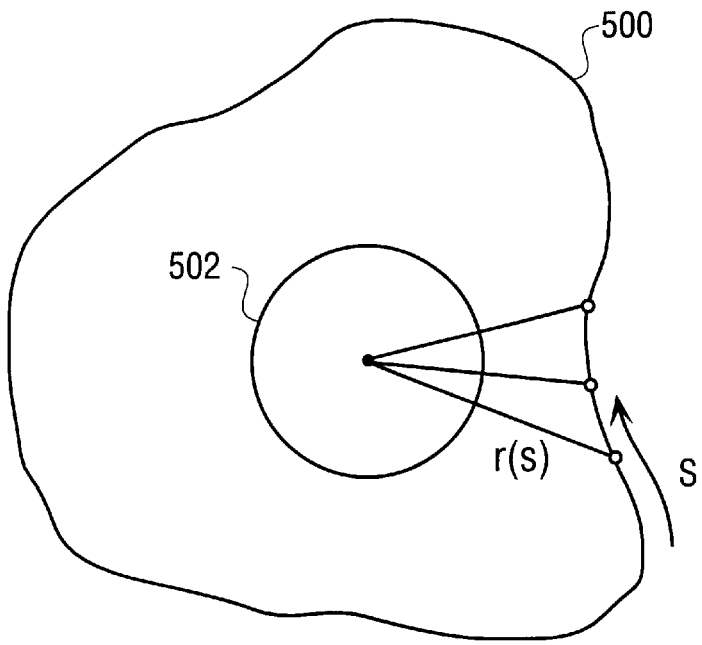
FIG. 5 illustrates a non-overlapping curve that is a cross-section of a surface onto which a scene is projected.

FIG. 5 illustrates a general non-overlapping curve that is a cross-section of a surface onto which a scene is projected. Shown in FIG. 5 is a general non-overlapping curve 500 enclosing a circle 502, and parametrized by arc length s. The circle 502 and closed curve 500 each represent horizontal cross sections of surfaces of extrusion with constant cross-sections. The circle 502 is a cross section of a vertical cylinder, and the closed curve 500 is a cross section of a general vertically oriented surface with a constant cross-section.

The present invention describes a method for (1) controlling the shape of the curve 500, and (2) creating a panoramic image of the scene projected onto the curve 500. To simplify the discussion it will be assumed that an initial panoramic image of a scene is given based on a vertical cylindrical geometry, although it will be readily apparent to those skilled in the art that any initial panoramic geometry, such as that of a sphere, can be used for the initial panoramic image. FIG. 5 illustrates how to convert a panoramic image of a scene from that of a cylindrical geometry to that of a general geometry corresponding to curve 500.

Coordinates for the surface of a vertical cylinder are given by (a, h) where a is the polar angle and h is the height, measured with respect to coordinate axes situated so that one axis lies along the central vertical axis of the cylinder. Coordinates for the general geometrical surface of extrusion are given by (s, z), where s is the arc length along curve 500 and z is the height, measured with respect to the same coordinate system as the cylindrical coordinates.

The mapping from cylindrical coordinates (a, h) to general coordinates (s, z) is given by a "similar triangle" proportionality:

$$a = \tan^{-1}(y(s)/x(s)), \quad z = r(s)h \qquad (1)$$

Where r(s) is the radial distance $r(s) = [x^2(s) + y^2(s)]^{1/2}$. Thus each panoramic image pixel value at (s, z) for the general geometric panorama is set to the cylindrical image pixel value at the corresponding (a, h). By carrying this out for a uniform sampling of (s, z) data, one obtains a digital panoramic image.

Equation (1) is used to map the general surface coordinates (s, z) to cylindrical coordinates (a, h). It requires knowledge of angular coordinates a along curve 500 as functions of s. In general, this is difficult to determine since it requires knowledge of (x, y) coordinates as a function of arc length s. The correspondence between (x, y) and s is usually difficult to determine.

One way to overcome this is to work backwards, and compute (x, y) coordinates along curve 500 from a uniform sampling of angular data a. From the (x, y) data, one computes arc length data s, say by accumulating the small incremental distances between adjacent pairs of (x, y) points. This generates a table of approximate arc length data s as a function of uniformly spaced angular data a. Inverting this table gives an approximation to the desired angular data a, as a function of uniformly spaced s data.

If the given panoramic image corresponds to a spherical geometry rather than a cylindrical geometry, then the elevation h in the above discussion is replaced with tan(b), where b is the azimuth angle, determining the longitude along the sphere.

In order to create a panoramic image with minimal distortion of horizontal lines, such as for purposes of printing a poster, one would like to project a scene onto a planar surface, such as the face of a cube. The cross-sectional curve 500 is actually a square when the underlying surface is a cube. On each side of the square either x or y is constant, and arc length is given by y or x, respectively, for purpose of applying (1).

A 360° scene projected onto a cube gives rise to a panoramic image with four sections, corresponding to the four vertical faces of the cube. Within each section, horizontal lines of the scene appear horizontal in the panoramic image. However, between sections non-horizontal straight lines exhibit a sharp bend, as indicated in FIG. 4A. In order to remove the bending artifact, the curve 500 can be adjusted to be a rounded square or, more generally, a rounded polygon. The rounded corners of the rounded polygon afford a buffer region to spread out the effect of the bending so that it becomes less noticeable. In addition, the sides of the polygon can be adjusted so that the rounded corners are positioned at locations within the scene where straight lines are absent.

Although the embodiment described herein relates to a rounded quadrilateral, the present invention applies to curves having more or fewer sides.

Figure 6:
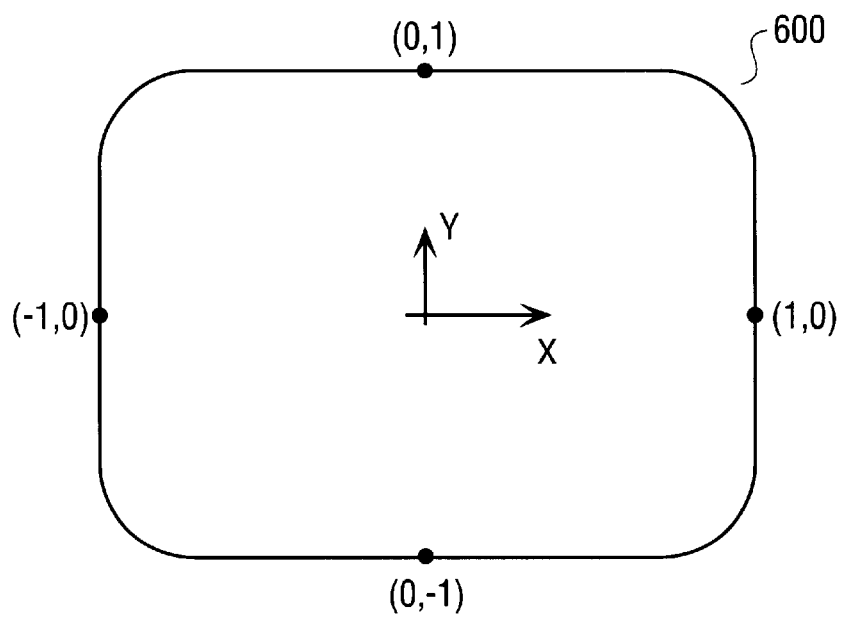
FIG. 6 is an illustration of a round-edged cube geometry upon which a scene may be projected to create a panoramic image.

One example of a rounded square shaped curve is the curve given by the equation $x^n + y^n = 1$, where n is a large positive integer. Such a curve 600 is illustrated in FIG. 6.

In one embodiment of the present invention a polyhedral surface is pre-configured, and the user interface only enables the user to rotate the polyhedral surface relative to a cylindrical panoramic image, preferably overlaid on the user interface template, and make adjustments to sides and edges of the polyhedral surface.

Figure 7:
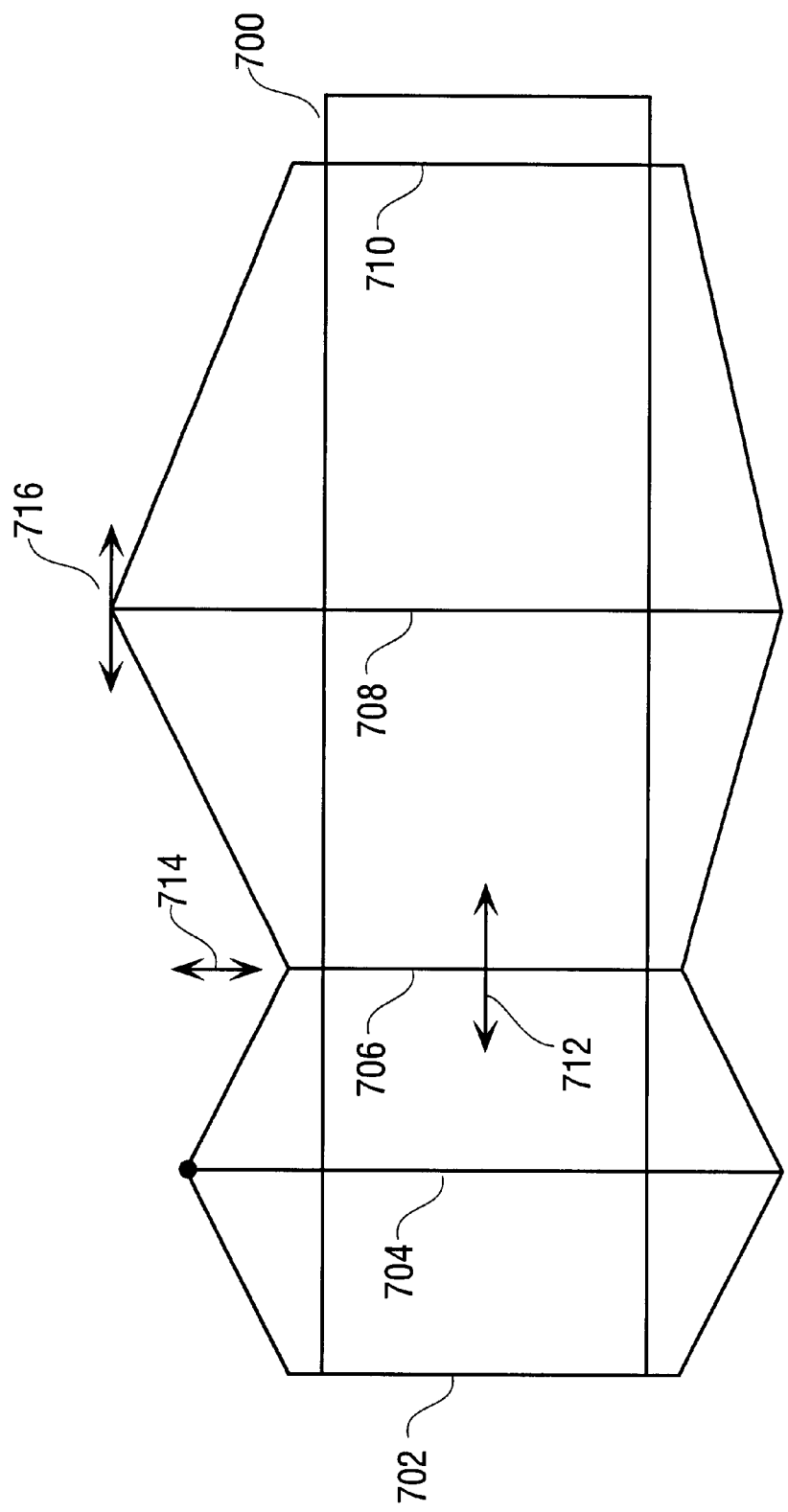
FIG. 7 is an illustration of a user interface for interactively adjusting a surface geometry onto which a scene is projected.

In this regard, FIG. 7 is an illustration of a user interface display for interactively adjusting (1) the sides of a quadrilateral, (2) the scale of the quadrilateral, or equivalently, its distance from the origin, and (3) the sharpness of the corners. The five vertical indicators 702, 704, 706, 708 and 710 overlay a panoramic image 700, and correspond to the locations of the four corners of the quadrilateral, with indicator 702 and indicator 710 being coincidental. By pulling an indicator such as indicator 706 horizontally left or right such as along arrow 712, a user can adjust the positions of the sides of the quadrilateral. By pulling an indicator such as indicator 706 up and down such as along arrow 714, a user can adjust the scaling factor, or radius r. By pulling an indicator such as indicator 708 such as along arrow 716, a user can adjust the sharpness of the corner defined by indicator 708.

Figure 8A:
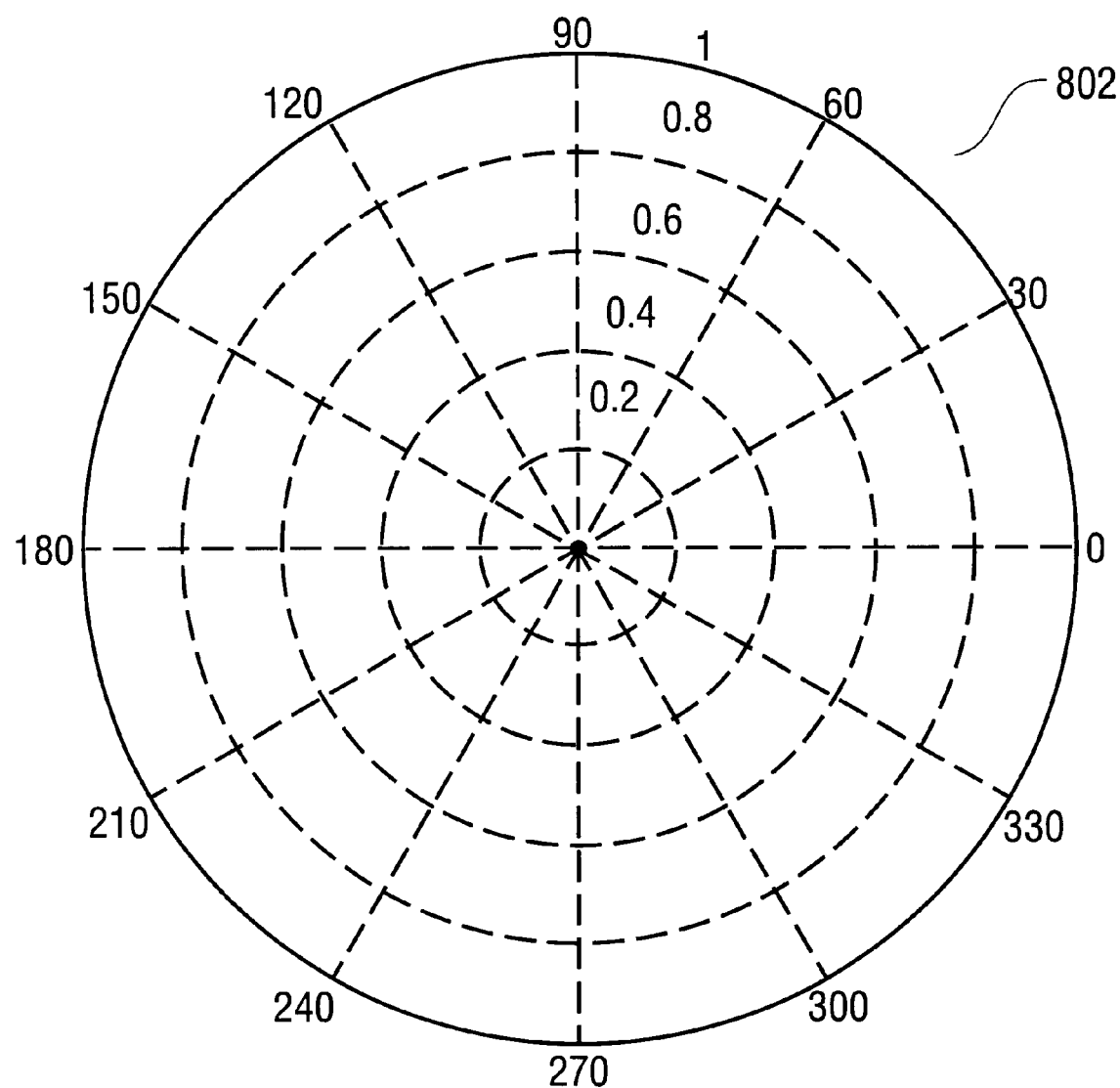
FIGS. 8A, 8B and 8C are illustrations of the curves corresponding to the panoramic images of FIGS. 3, 4A and 4B, respectively.
Figure 8B:
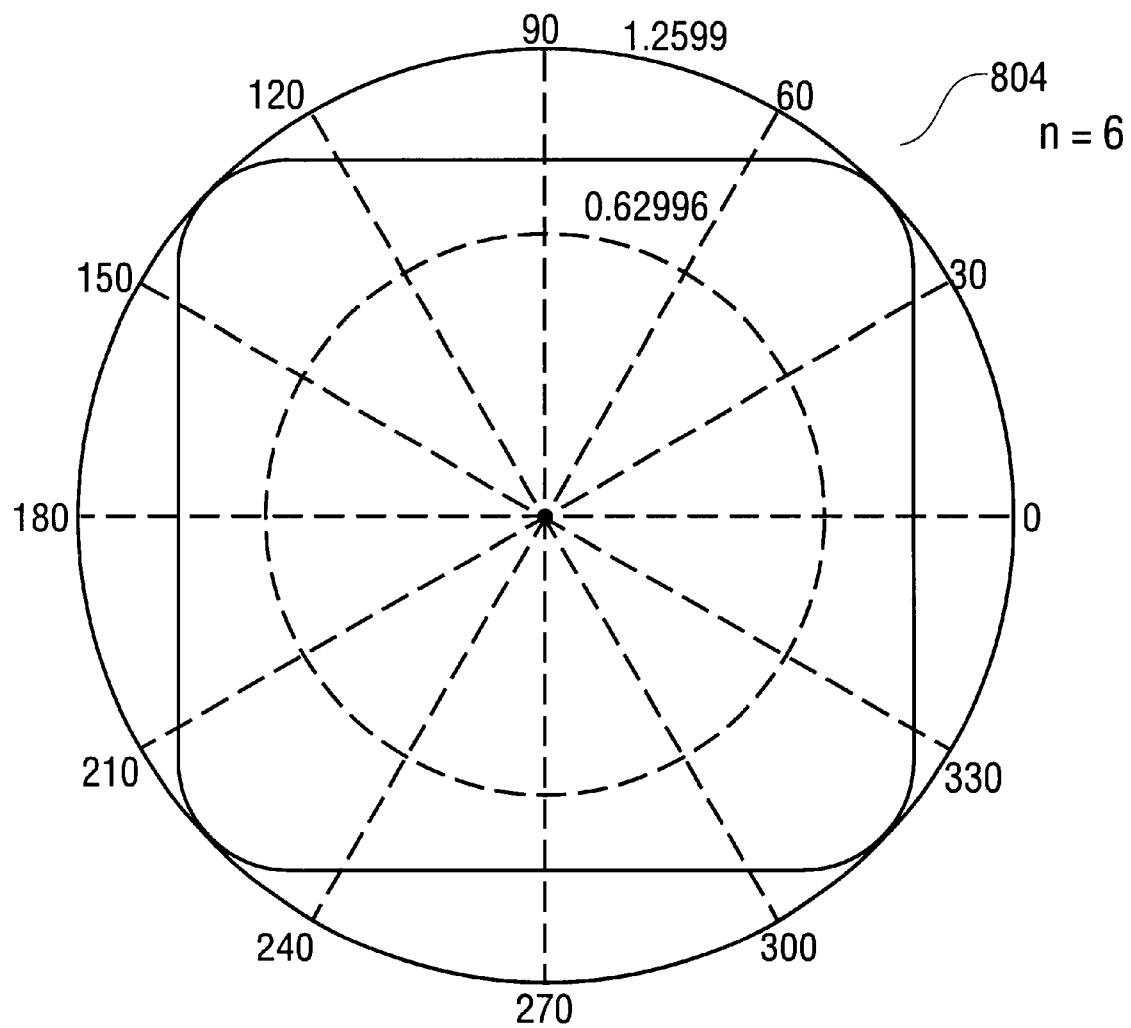
Figure 8C:
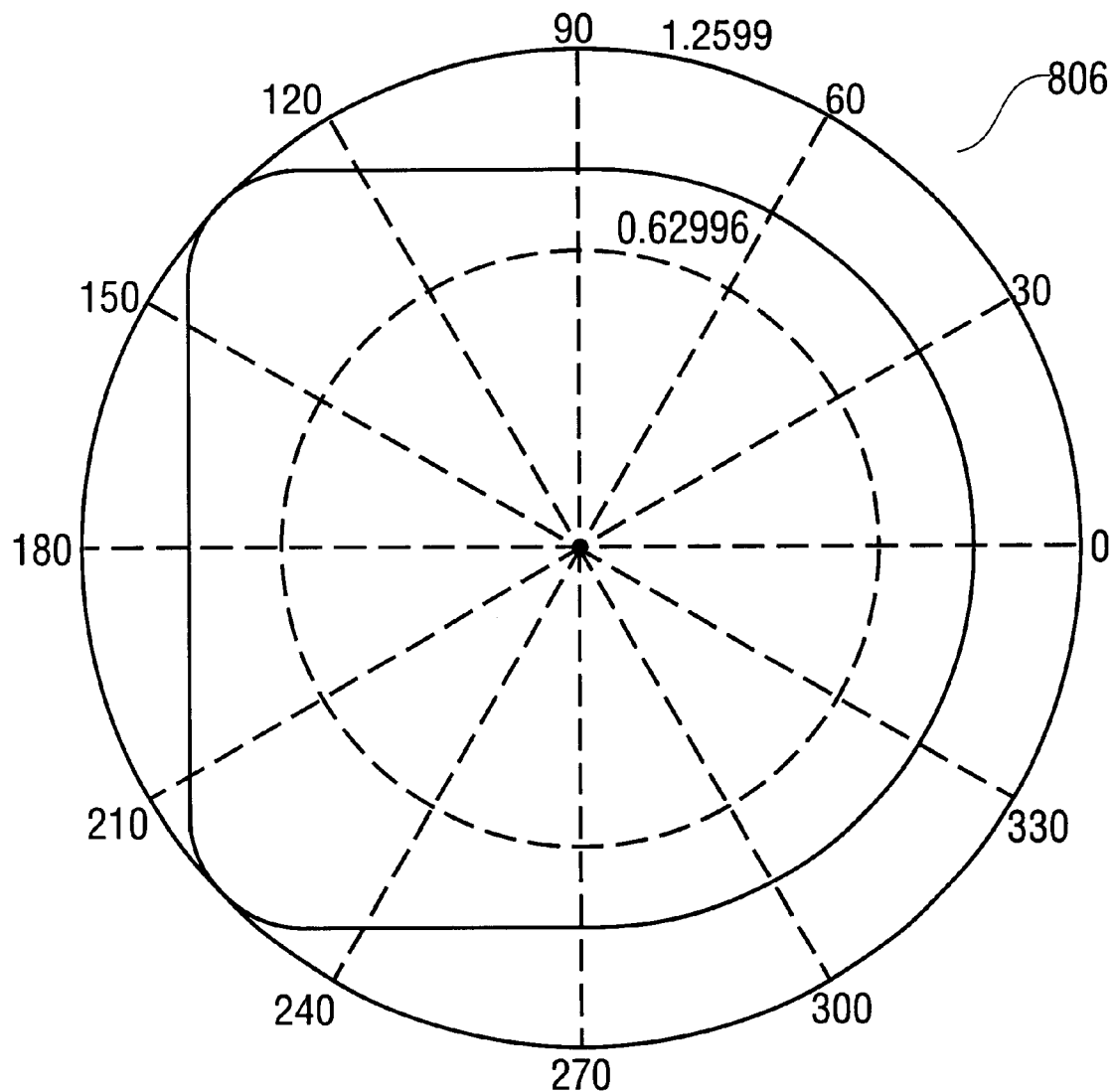

FIGS. 8A, 8B and 8C illustrate the curves 802, 804 and 806, corresponding to the panoramic images of FIGS. 2, 3 and 4, respectively. Curve 802 indicates the circular coordinate system for a cylinder, used as the surface of projection in FIG. 3. Curve 804 indicates the coordinate system for the rounded square curves of FIG. 6, with the value of n taken to be 6, used as the surface of projection in FIG. 4A. Curve 806 indicates the coordinate system for a hybrid rounded square/circle cross-section, used as the surface of projection in FIG. 4B. Removal of two corners of the rounded square serves to eliminate visible artifacts of straight lines being bent from FIG. 4A.

Figure 9:
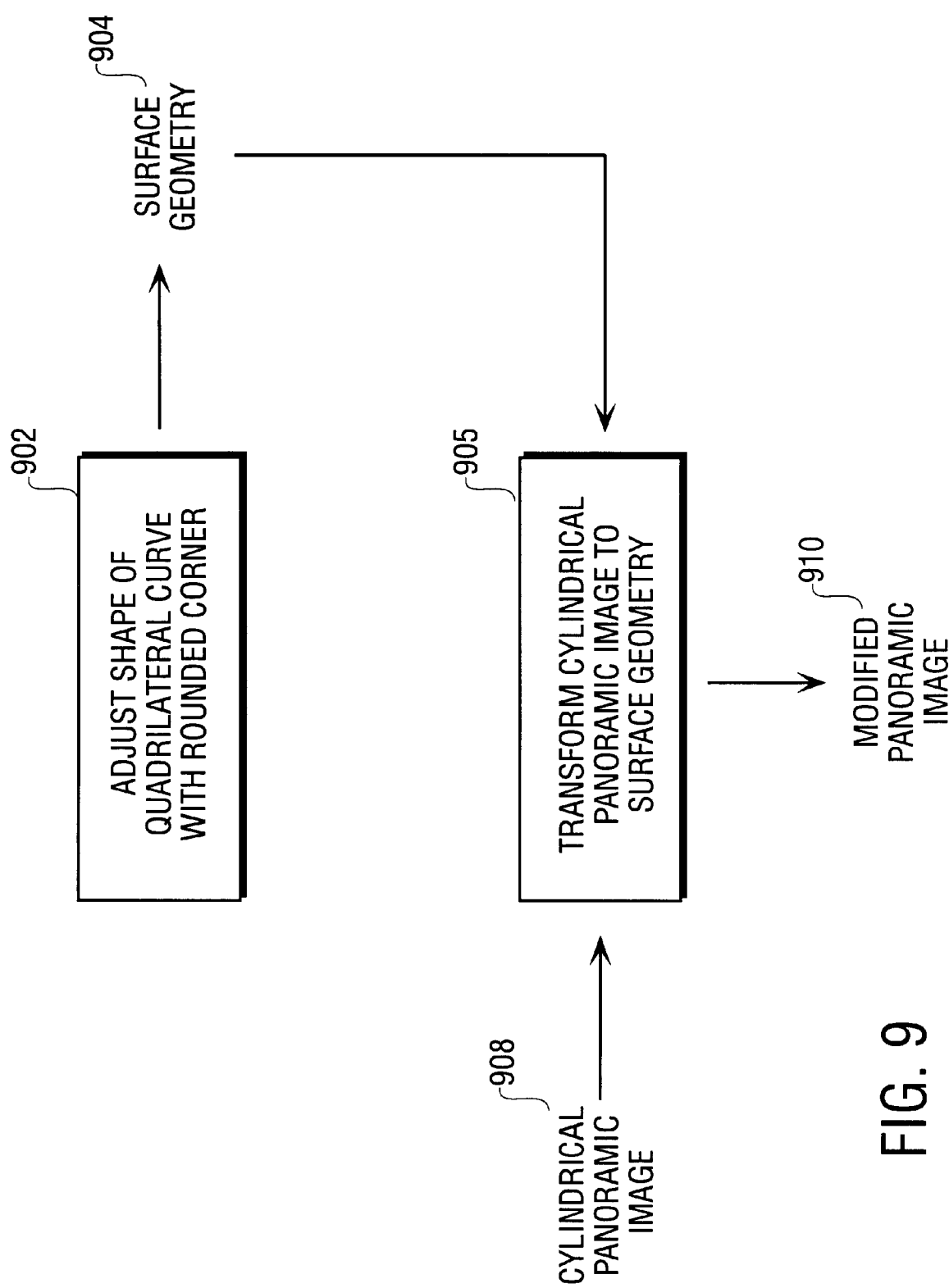
FIG. 9 is a simplified flowchart of a preferred embodiment of the present invention.

FIG. 9 is a simplified flowchart of a preferred embodiment of the present invention. At step 902 a user adjusts the shape of a quadrilateral curve with rounded corners, so as to determine a surface geometry 904. At step 906, a given cylindrical panoramic image 908 of a scene is transformed to the surface geometry corresponding to the quadrilateral curve determined at step 902, so as to produce a modified panoramic image 910.

Computer System Overview

Figure 10:
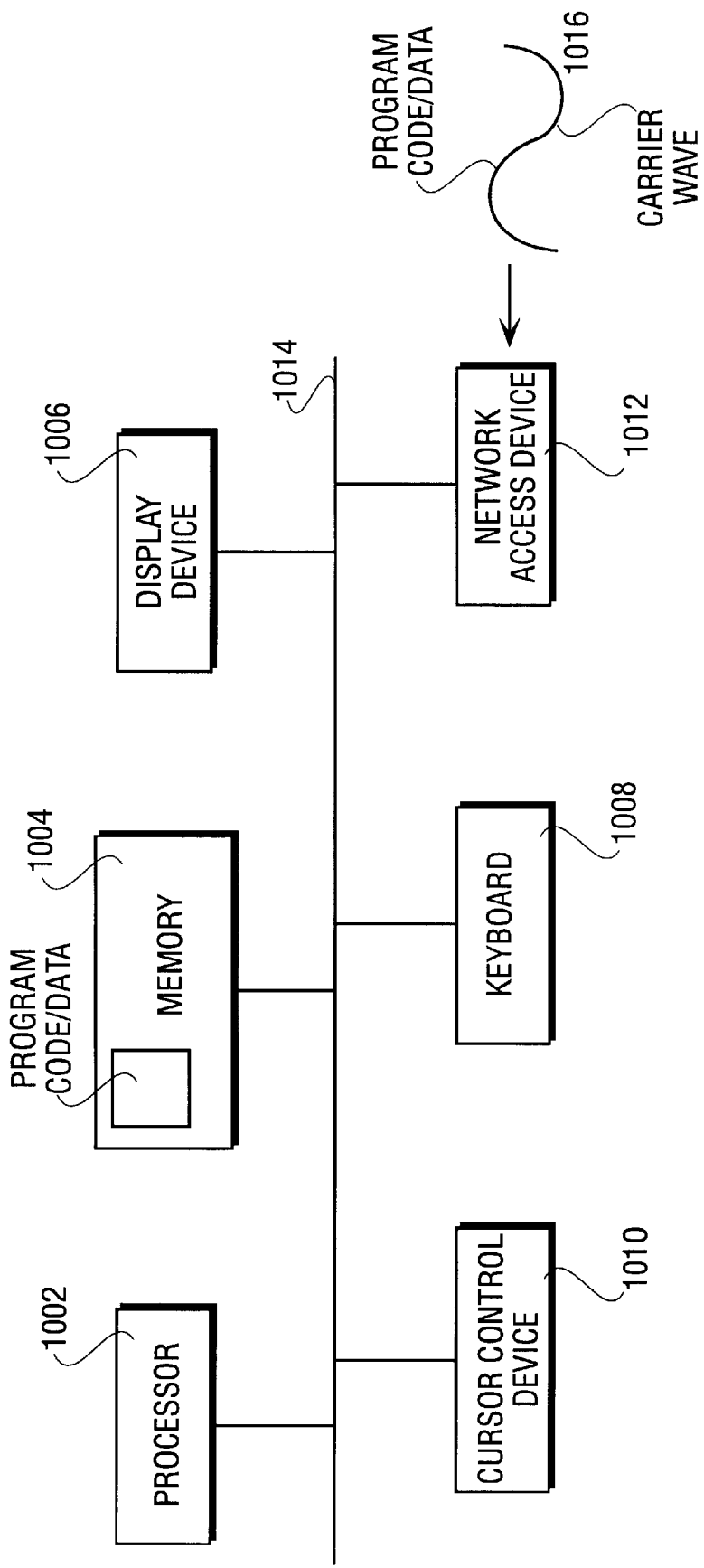
FIG. 10 is a block diagram of a general purpose computer system to implement preferred embodiments of the present invention.

FIG. 10 depicts a block diagram of a general purpose computer system. The computer system includes a processor 1002, memory 1004, display device 1006, keyboard 1008, cursor control device 1010 and computer network access device 1012 each coupled to a bus 1014. The cursor control device may be a mouse, trackball, pen or any other device for manipulating a cursor on the display device. Both the cursor control device and the keyboard enable the computer system to receive input from a computer user. The network access device may be a modem, network adapter card or any other device for coupling the computer system to a computer network. The network access device may be used to generate or receive a carrier wave 1016 having a computer data signal encoded therein. The carrier wave constitutes a computer-readable medium and the data signal encoded in the carrier wave can be used to generate instructions that may be executed by the processor to implement embodiments of the present invention.

The memory may include both operating memory (e.g., random access memory) and non-volatile memory such as a semiconductor read-only-memory, hard disk-drive, floppy disk-drive, optical disk-drive or any other computer-readable medium. When power is applied to the computer system, program code defining an operating system is loaded from non-volatile memory into operating memory by the processor or another device having access to the memory. Sequences of instructions comprised by the operating system are then executed by the processor to load other computer programs and portions of computer programs into operating memory from non-volatile memory. Embodiments of the present invention may be implemented in a sequence of instructions that can be stored in a computer-readable medium and executed by the processor.

It will be appreciated by persons skilled in the art that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

What is claimed is:

1. A method for modifying a panoramic image of a scene, so as to alter its surface geometry, comprising:
providing an initial panoramic image of a scene projected onto an initial surface;
generating, in response to user input, a desired surface upon which the scene is to be projected, wherein the desired surface is distinct from the initial surface; and
modifying said initial panoramic image by mapping points on said desired surface to corresponding points on said initial surface to produce a modified panoramic image corresponding to a projection of the scene onto said desired surface.

2. The method of claim 1 further comprising printing said modified panoramic image.

3. The method of claim 1 further comprising storing said modified panoramic image on a server computer for providing access over a network.

4. The method of claim 1 wherein said generating comprises repositioning indicators at selected areas within said initial panoramic image.

5. The method of claim 1 and wherein said generating comprises repositioning indicators to control the scale of said desired surface.

6. The method of claim 1 wherein said modified panoramic image has reduced distortion of straight lines as compared with said initial panoramic image.

7. The method of claim 1 wherein said desired surface is a surface with a rounded polygonal cross-section.

8. The method of claim 7 wherein said generating comprises positioning indicators to control the lengths of sides of said rounded polygonal cross-section.

9. The method of claim 7 and wherein said generating comprises positioning indicators to control the curvatures of corners of said rounded polygonal cross-section.

10. The method of claim 1 wherein the initial surface is a cylinder parameterized by a polar angle, a, and a height, h, and the desired surface is a surface of extrusion parameterized by an arc length, s, and a height, z, and wherein the mapping from points (x(s), y(s)) on the desired surface to corresponding points (a, h) on the initial surface is given by $$a=\tan^{-1}(y(s)/x(s)), z=r(s)h,$$

where $$r(s)=[x^2(s)+y^2(s)].$$

11. The method of claim 1 wherein the initial surface is a sphere parameterized by a polar angle, a, and an altitude angle, b, and the desired surface is a surface of extrusion parameterized by an arc length, s, and a height, z, and wherein the mapping from points (x(s), y(s)) on the desired surface to corresponding points (a, b) on the initial surface is given by $$a=\tan^{-1}(y(s)/x(s)), z=r(s)\tan(b),$$

where $$r(s)=[x^2(s)+y^2(s)]^{\frac{1}{2}}.$$

12. A method for creating a panoramic image of a scene, comprising:
generating, in response to user input, a desired surface onto which a scene is to be projected, comprising:
positioning indicators at selected areas within an initial panoramic image; and
computing a projection of the scene onto said desired surface to produce a panoramic image.

13. The method of claim 12 further comprising printing said panoramic image.

14. The method of claim 12 further comprising storing said panoramic image on a server computer for providing access over a network.

15. The method of claim 12 and wherein said generating further comprises positioning indicators to control the scale of said desired surface.

16. The method of claim 12 wherein said panoramic image has reduced distortion of straight lines as compared with said initial panoramic image.

17. The method of claim 12 wherein said desired surface is a surface with a rounded polygonal cross-section.

18. The method of claim 17 wherein said generating further comprises positioning indicators to control the lengths of sides of said rounded polygonal cross-section.

19. The method of claim 17 and wherein said generating further comprises positioning indicators to control the curvatures of corners of said rounded polygonal cross-section.

20. A method for creating, from a first panoramic image of a scene projected onto a first surface, a second panoramic image of the scene projected onto a second surface, wherein the second surface is distinct from the first surface, comprising:

provide said first panoramic image; and modifying said first panoramic image using said first and second surfaces to produce a second panoramic image corresponding to projection of the scene upon said second surface.

21. The method of claim 20 further comprising printing said second panoramic image.

22. The method of claim 20 further comprising storing said second panoramic image on a server computer for providing access over a network.

23. The method of claim 20 wherein said second panoramic image has reduced distortion of straight lines as compared with said first panoramic image.

24. A system for modifying a panoramic image of a scene, so as to alter its surface geometry, comprising:

a memory storing an initial panoramic image of a scene projected onto an initial surface;

a user interface generating a desired surface upon which said scene is to be projected, wherein the desired surface is distinct from the initial surface; and an image processor modifying said initial panoramic image by mapping points on said desired surface to corresponding points on said initial surface to produce a modified panoramic image corresponding to a projection of the scene onto said desired surface.

25. The system of claim 24 further comprising a printer for printing said modified panoramic image.

26. The system of claim 24 further comprising a server computer for distributing said modified panoramic image over a network.

27. The system of claim 24 wherein said user interface comprises adjustable indicators for selecting areas within said initial panoramic image.

28. The system of claim 24 and wherein said user interface comprises indicators for controlling the scale of said adjusted surface.

29. The system of claim 24 wherein said modified panoramic image has reduced distortion of straight lines as compared with said initial panoramic image.

30. The system of claim 24 wherein said generated surface is a surface with a rounded polygonal cross-section.

31. The system of claim 30 wherein said user interface comprises indicators for controlling the lengths of sides of said rounded polygonal cross-section.

32. The system of claim 30 and wherein said user interface comprises indicators for controlling the curvatures of corners of said rounded polygonal cross-section.

33. The system of claim 24 wherein the initial surface is a cylinder parameterized by a polar angle, a, and a height, h, and the desired surface is a surface of extrusion parameterized by an arc length, s, and a height, z, and wherein the mapping from points (x(s), y(s)) on the desired surface to corresponding points (a, h) on the initial surface is given by $$a = \tan^{-1}(y(s)/x(s)), \quad z = r(s)h,$$

where $$r(s) = [x^2(s) + y^2(s)]^{\frac{1}{2}}.$$

34. The system of claim 24 wherein the initial surface is a sphere parameterized by a polar angle, a, and an altitude angle, b, and the desired surface is a surface of extrusion parameterized by an arc length, s, and a height, z, and wherein the mapping from points (x(s), y(s)) on the desired surface to corresponding points (a, b) on the initial surface is given by $$a = \tan^{-1}(y(s)/x(s)), \quad z = r(s)\tan(b),$$

where $$r(s) = [x^2(s) + y^2(s)]^{\frac{1}{2}}.$$

35. A system for creating a panoramic image of a scene, comprising:

a user interface generating a surface upon which a scene is projected, to form a desired surface, comprising adjustable indicators for selecting areas within an initial panoramic image; and an image processor projecting said scene onto said desired surface to produce a panoramic image.

36. The system of claim 35 further comprising a printer for printing said panoramic image.

37. The system of claim 35 further comprising a server computer for distributing said panoramic image over a network.

38. The system of claim 35 and wherein said user interface further comprises indicators for controlling the scale of said desired surface.

39. The system of claim 35 wherein said panoramic image has reduced distortion of straight lines as compared with said initial panoramic image.

40. The system of claim 35 wherein said desired surface is a surface with a rounded polygonal cross-section.

41. The system of claim 40 wherein said user interface further comprises indicators for controlling the lengths of sides of said rounded polygonal cross-section.

42. The system of claim 40 and wherein said user interface further comprises indicators for controlling the curvatures of corners of said rounded polygonal cross-section.

43. A system for creating, from a first panoramic image of a scene projected onto a first surface, a second panoramic image of the scene projected onto a second surface, wherein the second surface is distinct from the first surface, comprising:

a memory storing first panoramic image of a scene; and an image processor modifying said first panoramic image using said first and second surfaces to produce a second panoramic image corresponding to projection of the scene upon said second surface.

44. The system of claim 43 further comprising a printer for printing said second panoramic image.

45. The system of claim 43 further comprising a server computer for distributing said second panoramic image over a network.

46. The system of claim 43 wherein said second panoramic image has reduced distortion of straight lines as compared with said first panoramic image.

47. A method for modifying a panoramic image of a scene, so as to alter its surface geometry, comprising:

providing an initial panoramic image of a scene projected onto an initial surface;

manipulating a polyhedral surface upon which the scene is to be projected, relative to said initial panoramic image, to form a desired surface, wherein the desired surface is distinct from the initial surface; and modifying said initial panoramic image by mapping points on said desired surface to corresponding points on said initial surface to produce a modified panoramic image corresponding to projection of the scene onto said desired surface.

48. The method of claim 47 wherein said manipulating comprises adjusting the scale of said polyhedral surface.

49. The method of claim 47 wherein said manipulating comprises rotating said polyhedral surface.

50. The method of claim 47 wherein said manipulating comprises re-positioning edges of said polyhedral surface.

51. The method of claim 47 wherein said modified panoramic image has reduced distortion of straight lines as compared with said initial panoramic image.

52. The method of claim 47 wherein the initial surface is a cylinder parameterized by a polar angle, a, and a height, h, and the desired surface is a surface of extrusion parameterized by an arc length, s, and a height, z, and wherein the mapping from points (x(s), y(s)) on the desired surface to corresponding points (a, h) on the initial surface is given by $$a=\tan^{-1}(y(s)/x(s)), z=r(s)h,$$

where $$r(s)=[x^2(s)+y^2(s)]^{\frac{1}{2}}.$$

53. The method of claim 47 wherein the initial surface is a sphere parameterized by a polar angle, a, and an altitude angle, b, and the desired surface is a surface of extrusion parameterized by an arc length, s, and a height, z, and wherein the mapping from points (x(s), y(s)) on the desired surface to corresponding points (a, b) on the initial surface is given by $$a=\tan^{-1}(y(s)/x(s)), z=r(s)\tan(b),$$

where $$r(s)=[x^2(s)+y^2(s)]^{\frac{1}{2}}.$$

54. A system for modifying a panoramic image of a scene, so as to alter its surface geometry, comprising:
 a memory storing an initial panoramic image of a scene projected onto an initial surface;
 a user interface manipulating a polyhedral surface upon which said scene is to be projected, relative to said initial panoramic image, to form a desired surface, wherein the desired surface is distinct from the initial surface; and
 an image processor modifying said initial panoramic image by mapping points on said desired surface to corresponding points on said initial surface to produce a modified panoramic image corresponding to a projection of the scene onto said desired surface.

55. The system of claim 54 wherein said user interface comprises adjustable indicators for adjusting the scale of said polyhedral surface.

56. The system of claim 54 wherein said user interface comprises adjustable indicators for rotating said polyhedral surface.

57. The system of claim 54 wherein said user interface comprises adjustable indicators for repositioning edges of said polyhedral surface.

58. The system of claim 54 wherein said modified panoramic image has reduced distortion of straight lines as compared with said initial panoramic image.

59. The system of claim 54 wherein the initial surface is a cylinder parameterized by a polar angle, a, and a height, h, and the desired surface is a surface of extrusion parameterized by an arc length, s, and a height, z, and wherein the mapping from points (x(s), y(s)) on the desired surface to corresponding points (a, h) on the initial surface is given by $$a=\tan^{-1}(y(s)/x(s)), z=r(s)h,$$

where $$r(s)=[x^2(s)+y^2(s)]^{\frac{1}{2}}.$$

60. The system of claim 54 wherein the initial surface is a sphere parameterized by a polar angle, a, and an altitude angle, b, and the desired surface is a surface of extrusion parameterized by an arc length, s, and a height, z, and wherein the mapping from points (x(s), y(s)) on the desired surface to corresponding points (a, b) on the initial surface is given by $$a=\tan^{-1}(y(s)/x(s)), z=r(s)\tan(b),$$

where $$r(s)=[x^2(s)+y^2(s)]^{\frac{1}{2}}.$$

61. A computer-readable medium having instructions stored thereon which, when executed by a processor, cause the processor to:
 provide an initial panoramic image of a scene projected onto an initial surface;
 generate, in response to user input, a desired surface upon which the scene is to be projected, wherein the desired surface is distinct from the initial surface; and
 modify said initial panoramic image by mapping points on said desired surface to corresponding points on said initial surface to produce a modified panoramic image corresponding to projection of the scene onto said desired surface.

62. The computer-readable medium of claim 61 wherein said computer-readable medium is a computer data signal encoded in a carrier wave.

63. The computer-readable medium of claim 61 wherein said computer-readable medium is a computer data signal encoded in a carrier wave.

64. The computer-readable medium of claim 61 wherein the initial surface is a cylinder parameterized by a polar angle, a, and a height, h, and the desired surface is a surface of extrusion parameterized by an arc length, s, and a height, z, and wherein the mapping from points (x(s), y(s)) on the desired surface to corresponding points (a, h) on the initial surface is given by $$a=\tan^{-1}(y(s)/x(s)), z=r(s)h,$$

where $$r(s)=[x^2(s)+y^2(s)]^{\frac{1}{2}}.$$

65. The computer-readable medium of claim 61 wherein the initial surface is a sphere parameterized by a polar angle, a, and an altitude angle, b, and the desired surface is a surface of extrusion parameterized by an arc length, s, and a height, z, and wherein the mapping from points (x(s), y(s)) on the desired surface to corresponding points (a, b) on the initial surface is given by $$a=\tan^{-1}(y(s)/x(s)), z=r(s)\tan(b),$$

where $$r(s)=[x^2(s)+y^2(s)]^{\frac{1}{2}}.$$

66. A computer-readable medium having instructions stored thereon which, when executed by a processor, cause the processor to:
- generate, in response to user input, a desired surface upon which a scene is to be projected by positioning indicators at selected areas within an initial panoramic image; and
- compute a projection of the scene onto said desired surface to produce a panoramic image.

67. A computer-readable medium having instructions stored thereon which, when executed by a processor, cause the processor to:
- provide a first panoramic image; and
- modify said first panoramic image using first and second surfaces to produce a second panoramic image corresponding to projection of a scene on said surface, wherein the second surface is distinct from the first surface.

68. The computer-readable medium of claim 67 wherein said computer-readable medium is a computer data signal encoded in a carrier wave.

* * * * *